United States Patent [19]

Barker et al.

[11] 3,986,812

[45] Oct. 19, 1976

[54] MOLD HANDLING APPARATUS

[75] Inventors: Joseph Barker, Birstall; Terence J. L. Clarke, Groby, both of England

[73] Assignee: USM Corporation, Boston, Mass.

[22] Filed: Apr. 14, 1975

[21] Appl. No.: 567,632

[30] Foreign Application Priority Data
May 9, 1974 United Kingdom............... 20634/74

[52] U.S. Cl.............................. 425/451.5; 249/162; 264/334
[51] Int. Cl.². ......................................... B29C 1/16
[58] Field of Search.............. 425/451, 451.2, 451.5, 425/453, 451.9; 249/161, 162, 170; 264/334, 336

[56] References Cited
UNITED STATES PATENTS
3,840,317  10/1974  Koch et al. .......................... 249/161

Primary Examiner—Francis S. Husar
Assistant Examiner—R. J. Charvat
Attorney, Agent, or Firm—Aubrey C. Brine; Richard B. Megley; Vincent A. White

[57] ABSTRACT

A mold handling device is provided which is suitable for use in the manufacture of articles molded in a wide variety of shapes and sizes from a plastic material such as polyurethane. First and second mold supports are provided to which mating mold portions are respectively secured. The device comprises means to provide mold opening and mold closing relative linear movements between the two mold supports, and drive means are provided to effect pivotal movement of the two supports about a pivot axis which extends transversely to the linear movement between the mold supports. One of the mold supports is mounted for independent pivotal movement about the same pivot axis whereby the arrangement facilitates access to each mold portion when the mold is open.

10 Claims, 11 Drawing Figures

MOLD HANDLING APPARATUS

BACKGROUND OF THE INVENTION

The present invention is concerned with mold handling apparatus.

In the molding of articles in a mold cavity provided by assembled portions of a split mold (for example, in injection molding), it is necessary when an article has been molded to separate the mold portions (open the mold) so that the molded article can be removed from the mold cavity. The mold portions have then to be brought together again (the mold closed) before a further article can be molded in the mold cavity.

Mold handling apparatus of many kinds has been suggested which serves to automatically bring together and separate the two portions of a two-part split mold for repeated molding of an article in the mold cavity provided thereby. In the field of injection molding of plastics materials, mold handling apparatus may be provided embodied in an injection molding machine, which also injects plastics material into the mold cavity after the mold has been closed, or it may be provided as free-standing apparatus to which a separate plastics injection unit can be brought.

It has been found that there is a requirement for a mold handling apparatus which is especially suitable for use in the manufacture of large components molded from a polyurethane plastics material. It is believed that such apparatus should ideally be arranged to allow for:

1. clear and convenient access by an operator to each mold portion when the mold has been opened, and especially to one portion of a two-portion mold, for the purposes of, for example, removing a molded article therefrom, cleaning and treating the mold portion, or placing reinforcing material (which is to be embodied in a molding) in the mold portion, 2. a wide variety of mold shapes and sizes to be accommodated by the apparatus (including relatively long and narrow mold forms), 3. mold support means of the apparatus to be pivotal so that the angle of disposition of a closed mold can be varied (so that, for example, a most suitable disposition of the mold can be achieved for a wide variety of mold forms), 4. it to be unnecessary for an operator to work in potentially dangerous situations as, for example, with his hands between opposed mold support means which could close to trap his hands, and 5 an operator to work substantially entirely from an opposite side of the apparatus from a plastics injection unit, which unit may be arranged to move to each in turn of a plurality of mold handling apparatus, and thus be a hazard to the operator.

When molding some plastics materials in split molds it may be necessary for very large clamping forces to be applied to the mold portions during injection of the plastics material into the mold cavity, and mold handling apparatus suitable for use in such circumstances, accordingly, tends to be of a heavy and rigid construction such as permits the large clamping forces to be applied. Commonly, the mold support means on which the mold portions are mounted are interconnected by tie bars to provide a sufficiently rigid and strong structure for the large clamping forces to be applied. However, the tie bars and other machine elements necessitated by the demand for very large clamping forces can tend to result in the mold support means, and mold portions thereon, being generally rather obstructed, to the inconvenience of an operator and leading to severe limitations on the variety of mold shapes and sizes which can be accommodated on the mold support means.

In the molding of polyurethane plastics materials, for example, such very large clamping forces are not necessarily required and it is believed that, accordingly, apparatus construction need not be so determined by high demands for rigidity and strength. It is considered that advantage can be taken of this factor to provide a mold handling apparatus which provides advantages over presently proposed apparatuses, both to an operator and generally in construction and operation.

It is, therefore, one of the various objects of the present invention to provide an improved mold handling apparatus which may be especially suitable for use in the manufacture of articles molded in a wide variety of shapes and sizes from a polyurethane plastics material, and which permits generally convenient and safe working conditions for an operator.

SUMMARY OF THE INVENTION

The invention provides in one of its aspects a mold handling apparatus comprising first mold support means to which a first mold portion can be secured, second mold support means to which a second mold portion can be secured, and drive means operative in use of the apparatus to effect substantially linear mold closing and mold opening relative movements between the two mold support means, the two mold support means being mounted for pivotal movement about a substantially horizontal pivot axis which extends transversely of the direction of said substantially linear relative movements, and one of the two mold support means being mounted for pivotal movement about said pivot axis independently of the other of the mold support means.

The invention provides in another of its aspects a mold handling apparatus comprising first mold support means to which a first mold portion can be secured, second mold support means to which a second mold portion can be secured, and drive means operative in use of the apparatus to effect mold closing and mold opening relative movements between the two mold support means, one of the two mold support means being mounted for substantially linear movement along guideway means and said guideway means being mounted for pivotal movement, independently of the other of said mold support means, about a pivot axis which extends transversely of the direction of said substantially linear movement.

The invention provides in yet another of its aspects a mold handling apparatus comprising first mold support means to which a first mold portion can be secured, and second mold support means to which a second mold portion can be secured, one of the two mold support means being mounted for substantially linear movement along guideway means and each of said guideway means and the other of the two mold support means being mounted for independent pivotal movement about a pivot axis which extends transversely of the direction of said substantially linear movement, the apparatus comprising also drive means operative in use of the apparatus to effect pivotal movement of the two mold support means about said pivot axis, and to effect said substantially linear movement of said one of the two mold support means to effect mold closing and mold opening movements thereof.

BRIEF DESCRIPTION OF THE DRAWING

There now follows a detailed description, to be read with reference to the accompanying drawings, of a mold handling apparatus which is illustrative of the invention. It is to be understood that this illustrative apparatus has been selected for description by way of example and not by way of limitation of the invention.

In the accompanying drawing.

DESCRIPTION OF A PREFERRED EMBODIMENT

Figure 1:
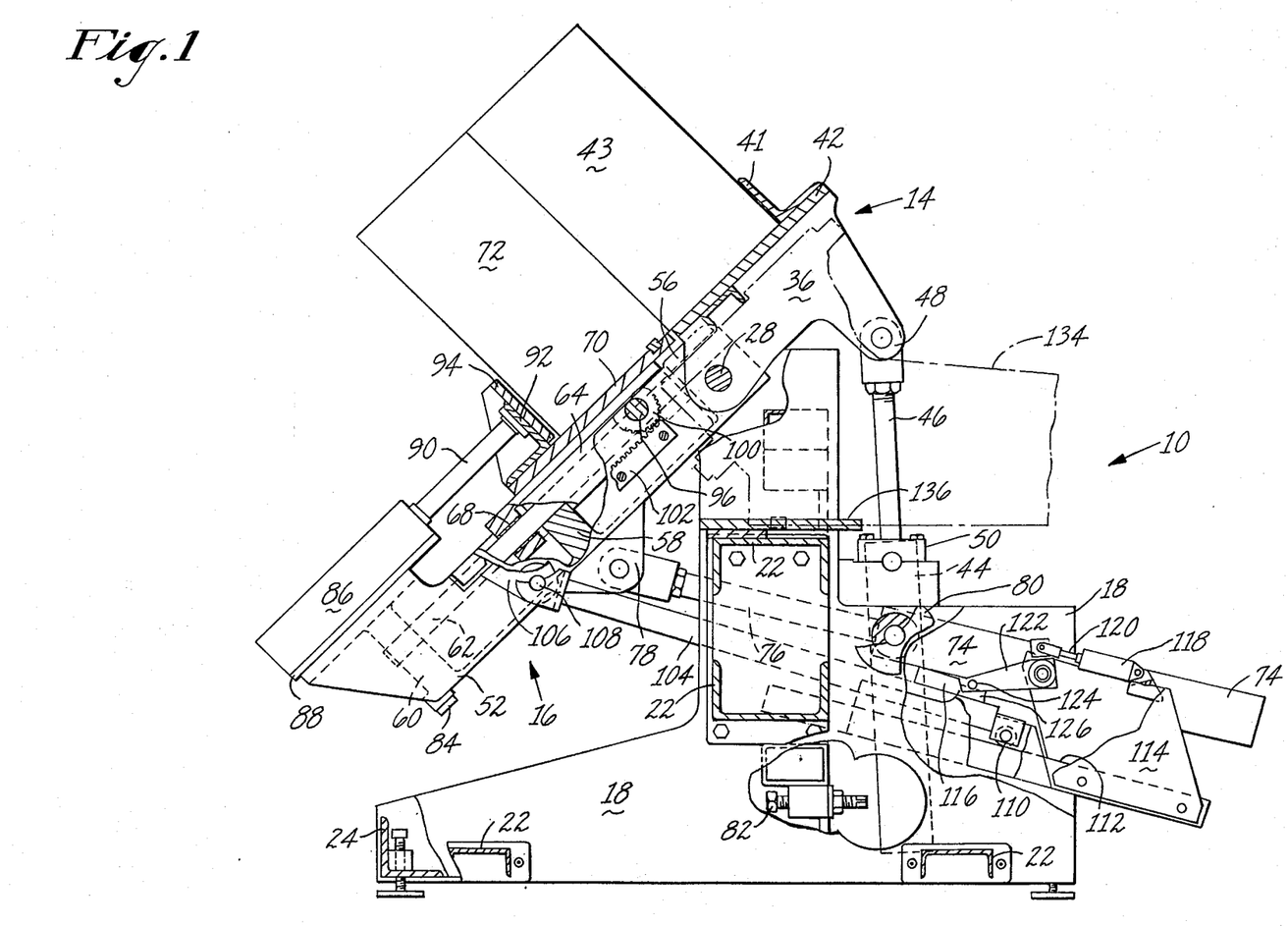
FIG. 1 is a view of the illustrative apparatus in side elevation taken generally along the line I—I of FIG. 2 but with parts broken away to reveal details of construction of a left-hand end portion of the apparatus.
Figure 2:
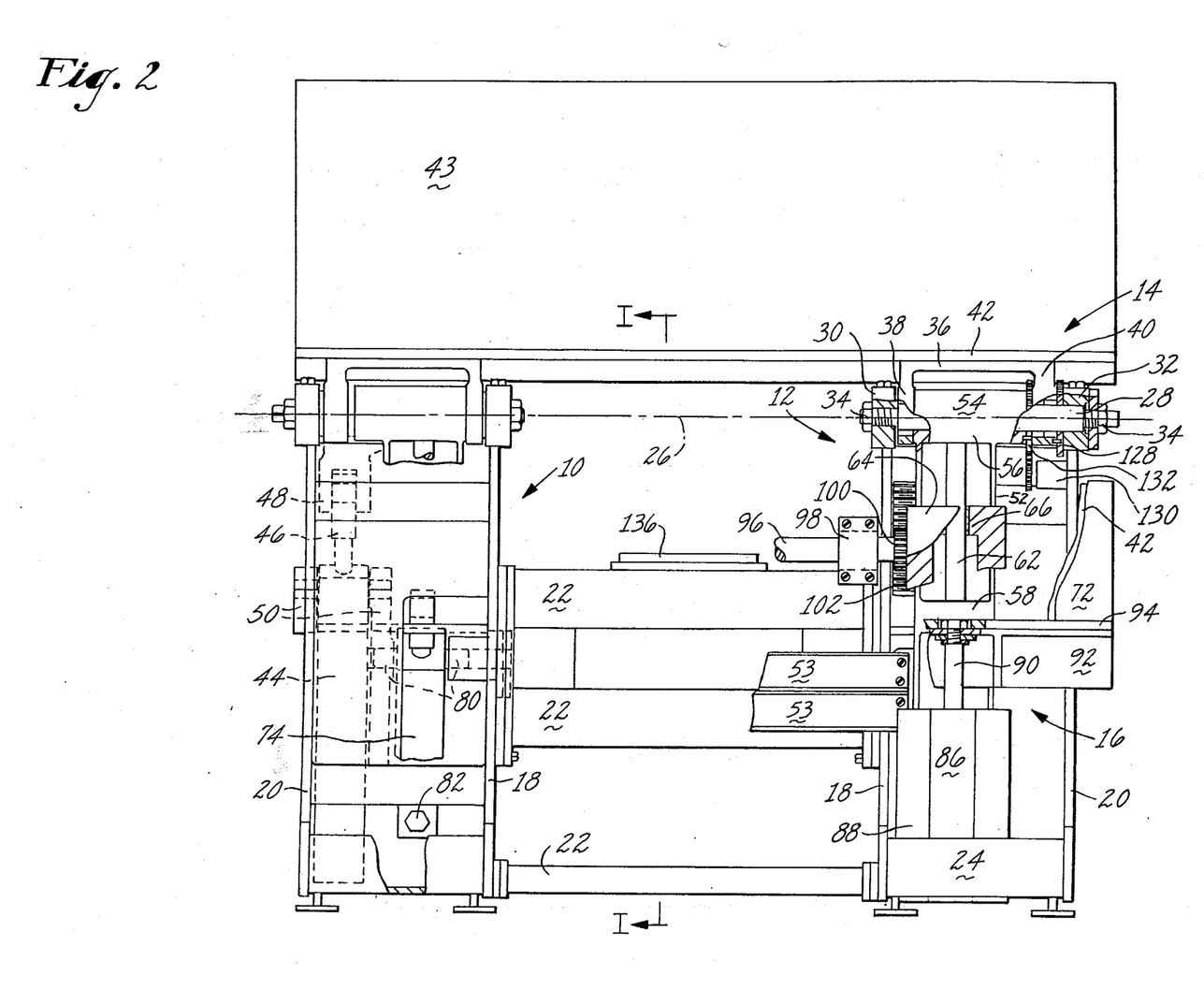
FIG. 2 is a front elevational view of the illustrative apparatus with parts broken away to reveal details of construction, particularly of a right-hand end portion of the apparatus.

The illustrative mold handling apparatus, as best seen in FIG. 2, comprises interconnected left-hand and right-hand end portions 10 and 12 respectively which are of substantially identical construction (though in mirror-image arrangement) and of synchronous operation. The illustrative apparatus comprises, as best seen in FIGS. 1 and 2, and as diagrammatically illustrated by FIGS. 4 to 9, first mold carrier means 14 and second mold carrier means 16 which each extend between, and are supported at, the left-hand and right-hand end portions 10, 12 of the apparatus.

The illustrative apparatus comprises a machine frame assembly comprising two side frame members at each of the left-hand and right-hand end portions of the apparatus, the two side frame members being an inner member 18 and an outer member 20 which are spaced apart widthwise of the apparatus and extend lengthwise of the apparatus, and rigid crosspieces 22 which extend widthwise of the apparatus between, and rigidly secure together, the two inner side frame members 18. Extending between each of the inner side frame members 18 and its adjacent outer side frame member 20 are spacing bars 24 (not shown), the bars 24 serving to rigidly secure together the side frame members 18 and 20 at each end portion of the apparatus at a required separation. There are thus provided at each of the left-hand and right-hand end portions of the apparatus, and rigidly interconnected by the crosspieces 22, rigid support frame assemblies provided by the spaced inner and outer side frame members 18 and 20 and the spacing bars 24.

The first and the second mold carrier means 14 and 16 of the illustrative apparatus are mounted on the support frame assemblies for pivotal movement about a horizontal pivot axis 26 of the apparatus (see also FIGS. 4 to 9). Mounted horizontally between the side frame members 18 and 20 of each support frame assembly is a fixed bearing shaft 28 (see FIGS. 2 and 3 especially) which provides a cylindrical bearing surface of which the longitudinal axis is the pivot axis 26 of the apparatus. A threaded inner end portion of each shaft 28 is supported in a bore in an inner shaft supporting boss 30 which is welded into the inner side frame member 18, and a partially threaded outer end portion of each shaft 28 is supported in a bore in an outer shaft supporting boss 32 which is welded into the outer side frame member 20. Each shaft 28 is secured against axial movement in the bosses 30 and 32 by nuts 34 screwed on to threaded end portions of the shaft.

The first mold carrier means 14 of the illustrative apparatus comprises two brackets 36, each with inner 38 and outer 40 spaced arms of a yoke portion thereof, the arms being mounted with roller bearings for rotation about one of the bearing shafts 28 (FIG. 2). The two brackets 36 have secured thereto first mold support means provided by an elongate first mold support member 42 generally in the form of a rectangular plate which extends across and between the brackets widthwise of the apparatus. A strengthening angle-beam 41 is secured along a rearward edge portion of the member 42. The mold support member 42 is constructed and arranged so that a first mold portion (shown diagrammatically at 43) can be secured thereto in a convenient manner. The brackets 36 are free to rotate about the shafts 28 through an angle of 90°, between a horizontal position, in which a mold bearing surface of the support member 42 is horizontal, and a vertical position, in which the surface is vertical (in front of the shaft 28). First drive means is provided for so moving the support member 42 about the pivot axis 26, the first drive means comprising two double-acting hydraulic cylinders 44 (see FIGS. 1 and 3) mounted one within each of the support frame assemblies with a piston rod 46 coupled to a rearward yoke coupling portion 48 of the adjacent bracket 36 of the first mold carrier means 14. Each of the hydraulic cylinders 44 is pivotally mounted in split bearings 50 (see FIGS. 1 and 3) for movement about an axis perpendicular to the longitudinal axis of the cylinder, housings for the bearings being secured to the support frame assembly. Thus by simultaneous actuation of the two cylinders 44, the brackets 36 and, hence, the first mold support member 42 can be pivotally moved about the pivot axis 26.

Figure 3:
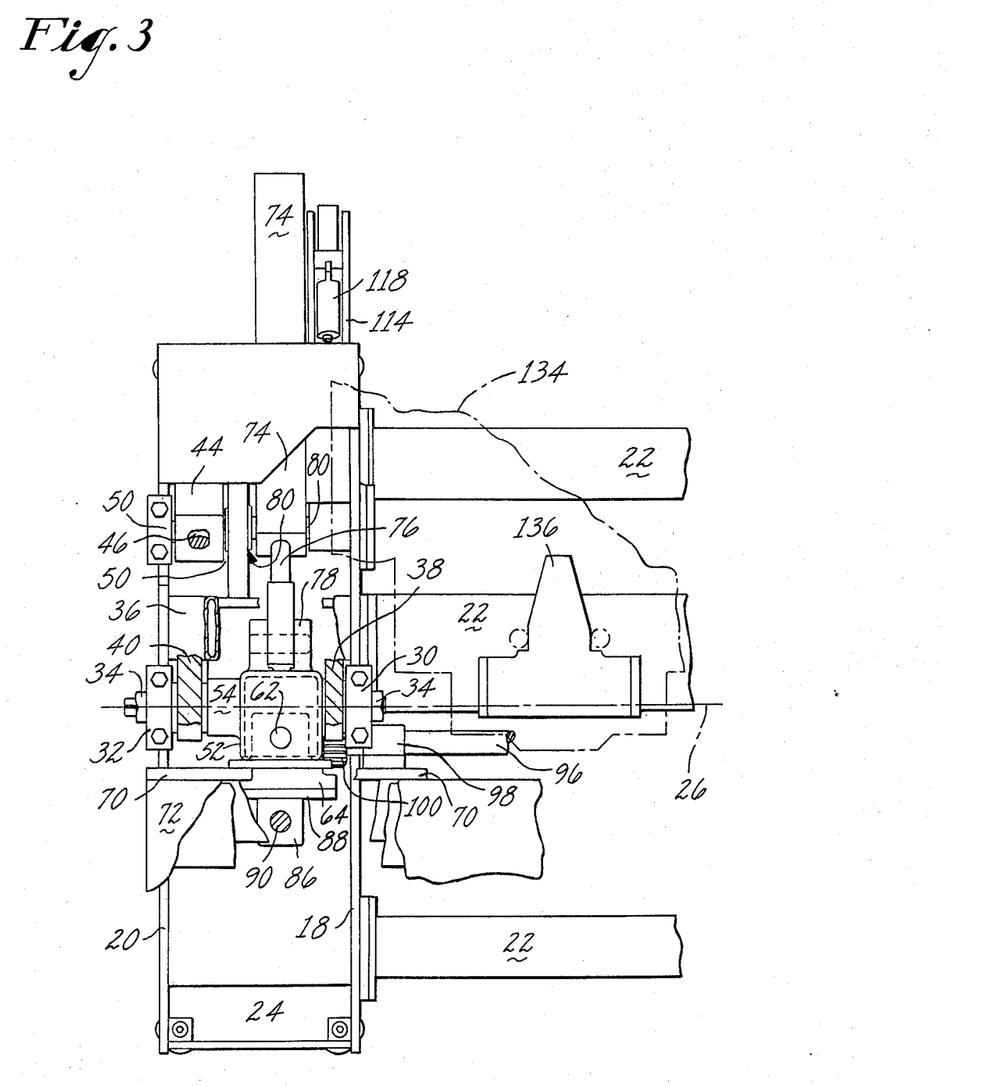
FIG. 3 is a plan view, partly broken away, of a central portion and a left-hand end portion of the illustrative apparatus.

The second mold carrier means 16 of the illustrative apparatus comprises two swinging arms 52 which depend one from each of the bearing shafts 28 and are interconnected by cross braces 53 which are bolted to the arms and extend therebetween; each arm 52 comprises a bored sleeve portion 54 which is rotatably mounted on the shaft 28 (as best seen in FIGS. 2 and 3). Each arm 52 (as best seen in FIGS. 1 and 2) is provided by a hollow casting which provides, between side wall portions of the casting, upper 56, middle 58, and lower 60 cross members in which are secured upper, middle and lower, respectively, portions of guideway means provided by a cylindrical pillar 62. For accommodating sliding movement along each of the pillars 62 there is mounted a mounting plate member 64 of which a flat mounting surface extends axially of the pillar, forwardly of the pillar. The plate member is provided with upper 66 and lower 68 bearing collars which are mounted on the pillar. The upper bearing collar 66 is mounted on the pillar 62 between the upper 56 and middle 58 cross members of the arm 52, and the lower bearing collar 68 is mounted on the pillar 62 between the middle 58 and lower 60 cross members of the arm. Secured to the mounting plate members 64 (one slidably mounted on each of the pillars 62, which are mounted in the arms 52, one at each of the left-hand and right-hand portions 10, 12 of the apparatus)

is second mold support means provided by an elongate second mold support member 70 which is generally in the form of a rectangular plate which extends across and between the mounting plate members 64 widthwise of the apparatus. The second mold support member 70 is constructed and arranged so that a second mold portion (shown diagrammatically at 72) can be secured thereto in a convenient manner.

The arms 52 are free to rotate about the shafts 28 through an angle of 90°, between a vertical position, in which a mold bearing surface of the second mold support member 70 is vertical, and a horizontal position, in which the surface is horizontal (above the shaft 28). Second drive means is provided for so moving the second mold support member 70 about the pivot axis 26, the second drive means comprising two double-acting hydraulic cylinders 74 (see FIGS. 1 and 3) mounted one within each of the support frame assemblies with a piston rod 76 coupled to a yoked coupled portion 78 of the arm 52 of the second mold carrier means. Each of the cylinders 74 is pivotally mounted in bearings 80 (see FIGS. 1 and 3) for pivotal movement about an axis perpendicular to the longitudinal axis of the cylinder, housings for the bearings being secured to the support frame assembly. Thus by simultaneous actuation of the two hydraulic cylinders 74, the arms 52, and hence the second mold support member 70 can be pivotally moved about the pivot axis 26. An adjustable stop 82 (FIGS. 1 and 2) is mounted within each of the support frame assemblies so that downward swinging movement of the arms 52 can be arrested at a convenient position, for example, when the bearing surface of the second mold support member 70 is vertical (and the arms 52 depend vertically from the shafts 28). A screw head of the stop 82 is situated to be engaged by a stop pad 84 mounted on the arm 52.

For moving the plate members 64 (and hence a second mold portion 72 mounted on the second mold support member 70) along the guideway provided by the pillars 62, there are provided two double-acting hydraulic cylinders 86 which are secured one to a lower mounting plate 88 on each of the arms 52. The cylinders 86 are mounted with piston rods 90 projecting axially therefrom parallel to the axes of the pillars 62. A threaded upper end portion of each of the piston rods 90 is secured to a projecting portion of an angle bracket 92 which is secured to both of the second mold support members 70 and extends therebetween. The projecting portion of the bracket 92 projects perpendicularly from the mold bearing surface of the support member 70. An elongate rectangular cover plate 94 is secured to the projecting portion of the bracket 92 to lie along the length of the bracket, positioned between the projecting portion and a second mold portion 72 mounted on the second mold support member 70. By simultaneous actuation of the two hydraulic cylinders 86, the second mold support member 70 can thus be driven along the arm 52, axially of the pillars 62, toward and away from the shaft 28.

To ensure that identical movement of each of the plate members 64 occurs along the pillars 62 on actuation of the cylinders 86, the second mold carrier means 16 comprises a rack and pinion arrangement to coordinate the movements of the plate members 64. A horizontal shaft 96 (see FIGS. 1 and 3) extends widthwise of the apparatus between two supporting brackets 98 which are mounted one toward each end of the second mold support member 70, the brackets 98 being secured to the support member 70 and the shaft 96 being freely rotatable in bearings provided by the brackets. Adjacent each bracket 98, a pinion wheel 100 is keyed to the shaft 96 (for rotation therewith) and the teeth of the pinion wheel engage with the teeth of a rack member 102 which is secured to the arm 52. The two rack members 102 and the two pinion wheels 100 are identical so that any movement of one plate member 64 (being secured to the second mold support member 70) along its associated pillar 62 necessarily entails an identical movement of the other plate member 64 along its associated pillar 62, since the rotary motion of the pinion wheels 100 (coupled by the shaft 96) must be identical.

The illustrative apparatus comprises locking means whereby the second mold carrier means 16 (and the first mold carrier means 14 when coupled thereto, as by first mold portion 43 and second mold portion 72 on the first mold support member 42 and second mold support member 70 being secured together during a molding operation) can be positively held at a desired inclination, for example, as shown in FIG. 1. Two trailing arms 104 are coupled to two brackets 106 which are provided one by each of the arms 52, the coupling being effected by horizontal pivot pins 108 so that the trailing arms 104 can pivot freely about a horizontal axis at the pins 100. A freely rotatable roller 110 is mounted on a rearward end portion of each of the trailing arms 104 and is arranged to roll along a runway 112 which extends lengthwise of the apparatus and is provided by a locking means frame assembly 114.

Thus, as the arms 52 of the second mold carrier means 16 are pivoted about the pivot axis 26 of the apparatus (i.e., about the shafts 28), the two trailing arms 104 follow the movement of the arms 52, with their rearward end portions supported by the rollers 110. Secured to an upper surface of each trailing arm 104 is an adjustable stop member 116, which can be secured in any desired position of adjustment along a length of the arm 104.

Mounted on each frame assembly 114 is a double-acting pneumatic cylinder 118 from which a piston rod 120 extends forwardly of the apparatus in a direction substantially parallel to the runway 112. Coupled to the piston rod 120 is an upwardly projecting arm of a substantially L-shaped pivotally mounted lever 122, the lever 122 being mounted on the frame assembly to rock about an axis passing substantially through the junction of the upwardly projecting arm and a lower, forwardly projecting, arm of the lever.

As the piston rod 120 is reciprocated by operation of the cylinder 118, the lever 122 is rocked between a raised portions, in which a forward end portion of the lower arm is raised away from the trailing arm 104, and a lowered position in which two pins 124, which project from either side of the forward end portion, rest on two upstanding abutments 126 provided by the frame assembly 114. When the levers 122 are in their lowered positions, the forward end portions of the lower arms of the levers are positioned to intercept and arrest the stop members 116 as the second mold carrier means 16 is lowered (moved anticlockwise as viewed in FIG. 1) and the trailing arms 104 are pushed by the arms 52 rearwardly of the apparatus. Interengaging faces of the stop members 116 and the forward end portions of the lower arms of the levers 122 are shaped to ensure that as the stop members engage the levers the pins 124 are pressed downwardly into engagement with the aubtments 126 to provide for a positive location of the second molar carrier means 16.

The illustrative apparatus comprises control means of a conventional kind for controlling operation of the illustrative apparatus. To record, continuously during operation of the apparatus, the angular dispositions of the first mold carrier means 14 and the second mold carrier 16 and the position of the second mold support member 70 on the pillars 62, the illustrative apparatus comprises three encoder devices which supply to the control means signals indicative of position. A first encoder device (not shown) is driven by a first gear wheel 128 mounted on the shaft 28 of the right-hand end portion 12 (see FIG. 2). The gear wheel 128 is keyed to the outer arm 40 of the yoke portion of the bracket 36 (of the first mold carrier means 14) for rotation therewith about the pivot axis 26. Thus the first encoder device can provide a signal indicative of the angular displacement of the first mold carrier means 14 from a datum position.

A second encoder device 130 is driven by a second gear wheel 132 mounted on the same shaft 28 as the first gear wheel 128. The second gear wheel 132 is keyed to the sleeve portion 54 of the arm 52 (of the second mold carrier means 16) for rotation therewith about the pivot axis 26. Thus the second encoder device 130 can provide a signal indicative of the angular displacement of the second mold carrier means 16 from a datum position. A third encoder device (not shown) is similarly arranged to indicate the displacement of the second mold support member 70 from a datum position, means (not shown) being provided to convert the linear movement (parallel to the pillars 620 of the support member 70 into a rotary motion for transmission to the third encoder.

The illustrative apparatus is constructed for use with an injection device (indicated in dot-dash lines at 134) which in operation is moved lengthwise of the illustrative apparatus between a rearward position and a forward position in which it is positioned to cooperate with a closed mold provided by first mold portion 43 and second mold portion 72 mounted, respectively, on the first mold support member 42 and second mold support member 70. To guide the injection device, as it moves forwardly to its forward position, a rearwardly projecting spade-cam member 136 (FIG. 3) is secured to an upper one of the cross pieces 22 (between the two support frame assemblies). As the injection device is moved forwardly, two rollers on the injection device are guided one along each of two parallel edges of the member 136 to correctly align the injection device.

Two sequences of operation of the illustrative apparatus will now be described to illustrate intended modes of use, and capabilities, of the illustrative apparatus. Each sequence commences with the illustrative apparatus in a rest condition as illustrated diagrammatically by FIG. 4. A first mold portion 43 is mounted on the first mold support member 42 and a second mold portion 72 is mounted on the second mold support member 70. The two mold portions embody mold clamping means (not shown) whereby the portions can be clamped together with a required clamping force applied; operation of the mold clamping means, which serves also as initial mold opening means, is controlled by the control means of the illustrative apparatus.

Figure 4:
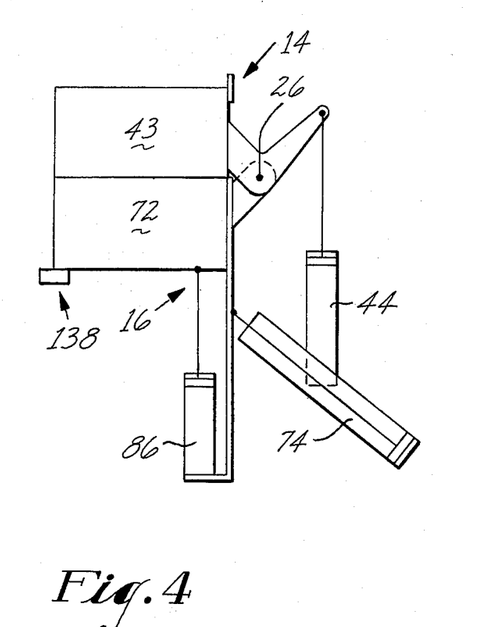
FIGS. 4, 5, 6, 7a, 7b, 8a, 8b and 9 illustrate diagrammatically two sequences of operative of the illustrative apparatus.
Figure 5:
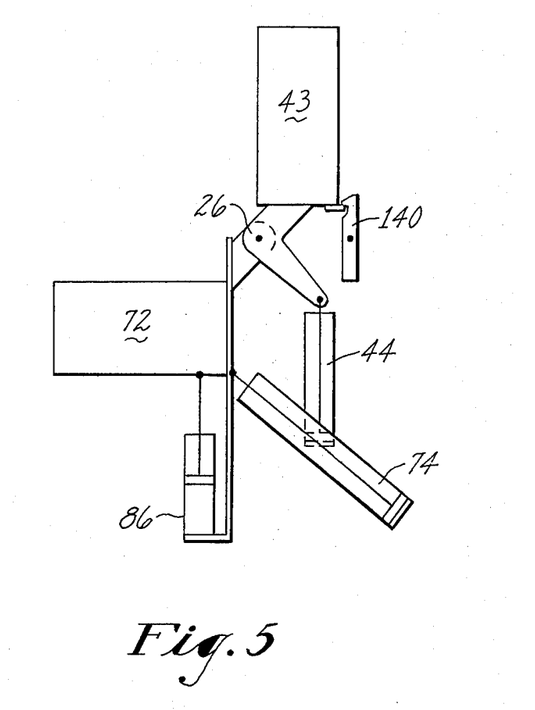
Figure 6:
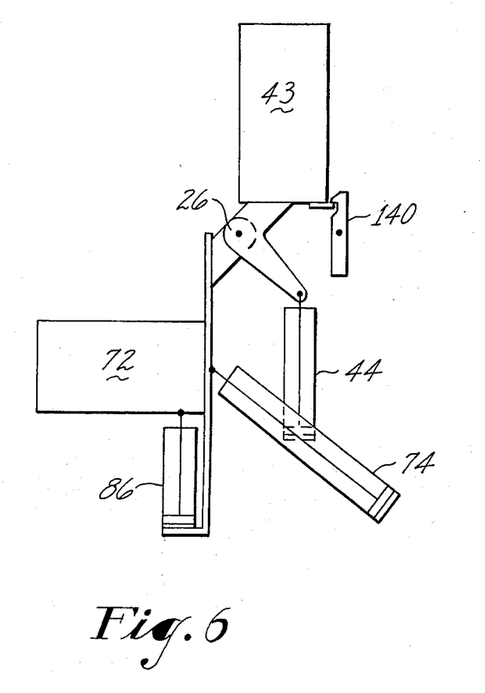

In each of first and second sequences of operation of the illustrative apparatus (as illustrated by FIGS. 4, 5 and 6) a first safety latch 138, which supports the second mold support member 70 when the support member 70 is in a fully advanced position on the arms 52 (FIG. 4), is withdrawn and cylinder 86 actuated to lower the support member 70 to a fully retracted position. Cylinder 44 is then actuated to pivot the first mold carrier means 14 about the pivot axis 26 to its horizontal position (in which the mold bearing surface of the first mold support member is horizontal) and a second safety latch 140 is then engaged to retain the first mold carrier means in this position. Cylinder 86 is then actuated to raise the second mold support member 70 on the arms 52 to a mid position, at which the mold portion 72 is presented at a convenient height for an operator to work thereupon (FIG. 5). Cylinder 86 is then actuated to lower the second mold support member 70 to its retracted position (FIG. 6).

Figure 7A:
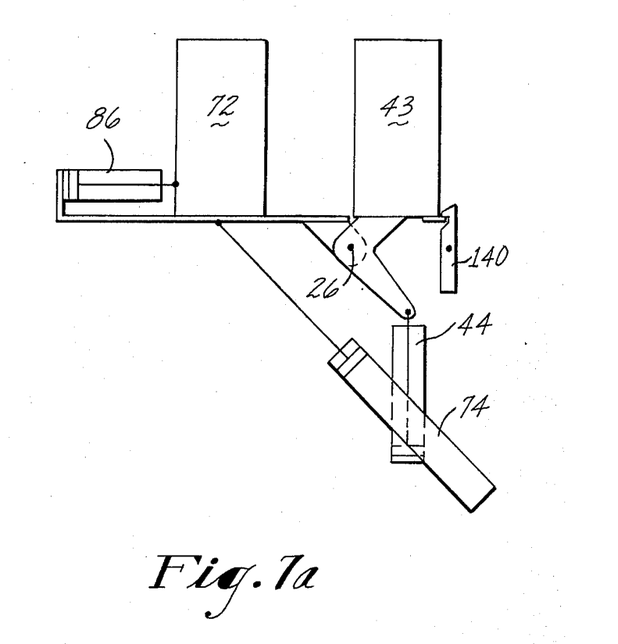
Figure 8A:
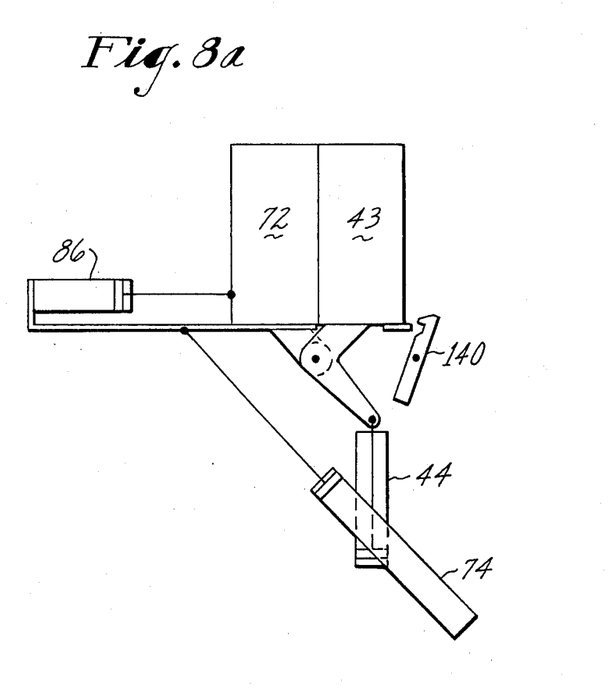

In the first sequence of operation (as illustrated by FIGS. 7a and 8a) the cylinder 74 is now actuated to swing the second mold carrier means 16 about the pivot axis through 90° to a horizontal position in which the mold bearing surface of the second mold support member 70 is horizontal (FIG. 7a). Cylinder 86 is then actuated to advance the second mold support member 70 to its fully advanced position, at which the first mold portion 43 and second mold portion 72 are separated by only a small distance. The mold clamping means of the mold portions is then actuated to securely clamp together the two mold portions 43, 72 in preparation for injection of a polyurethane-forming molding composition into a mold cavity provided jointly thereby. The second safety latch 140 is then released (FIG. 8a).

Figure 7B:
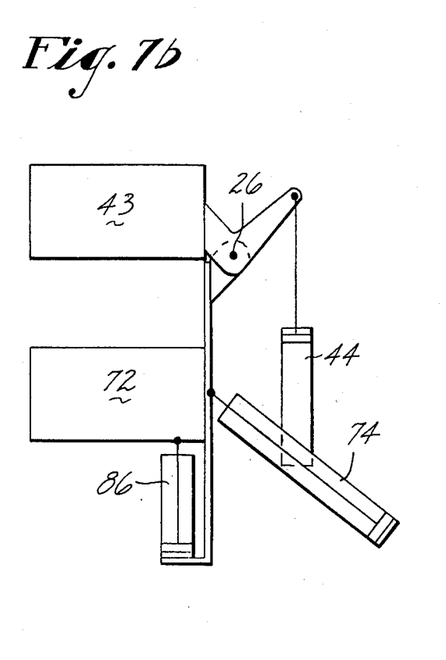
Figure 8B:
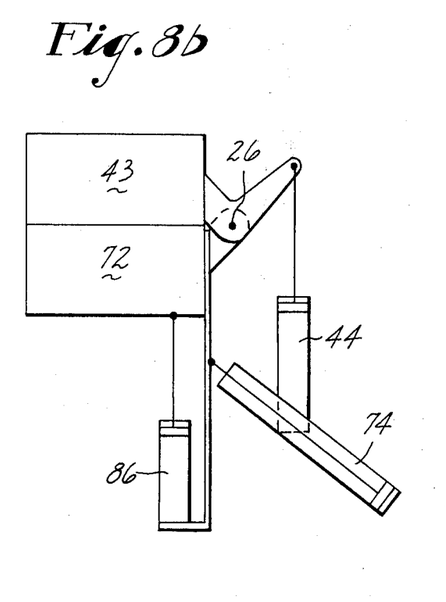

In the second sequence of operation (as illustrated by FIGS. 7b and 8b), after the second mold support member 70 has been lowered to its retracted position (FIG. 6), the first safety latch 138 is released and then cylinder 44 is actuated to pivot the first mold carrier means 14 to its vertical position (in which the mold bearing surface of the first mold support member 42 is vertical as in FIG. 7b. Cylinder 86 is then actuated to raise the second mold support member 70 to its advanced position, at which the first mold portion 43 and second mold portion 72 are separated by only a small distance. The mold clamping means is then actuated to securely clamp together the two mold portions in preparation for injection of a polyurethane-forming molding composition into the mold cavity jointly thereby (FIG. 8b).

Figure 9:
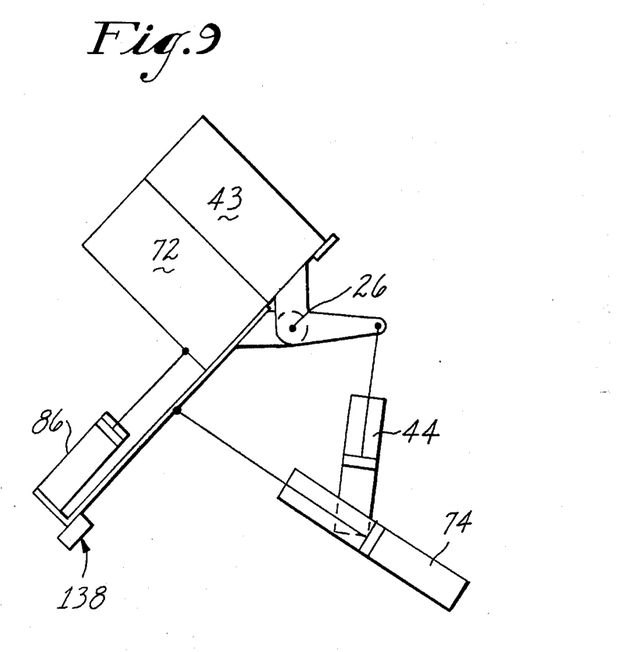

In each of the first and second sequences of operation of the illustrative apparatus, cylinder 74 is now actuated to swing the second mold carrier means 16 (and hence also the first mold carrier means 14, since the two carrier means are coupled by the mold clamping means) about the pivot axis 26 to a desired angle of inclination, between its vertical and horizontal positions, for injection of molding composition to take place (FIG. 9). The second mold carrier means 16 is secured at such angle of inclination by the locking means hereinbefore described. The injection device 134 is now advanced to its forward position and polyurethane-forming composition injected into the mold cavity provided by the mold portions.

After injection is complete the injection device is retracted and, after a required rest period for the molding composition to solidify, the illustrative apparatus can be returned to a condition as illustrated in FIG. 5 by a sequence of operation similar to those just described, but in reverse. A molded article, provided by the solidified molding composition, can be removed from the mold cavity when the mold is opened. The second mold support member 70 is then at its mid position at a convenient height for an operator to work upon the second mold portion 72.

We claim:

1. Mold handling apparatus comprising a frame on which is mounted first mold support means to which a first mold portion is to be secured and second mold support means to which a second mold portion is to be secured, drive means connected at least one of said mold support means and operative during use of the apparatus to effect substantially linear mold closing and mold opening relative movements between the two mold support means, each of said two mold support means being mounted for pivotal movement relative to said frame about a substantially horizontal pivot axis which extends transversely of the direction of said substantially linear movements, and each of said two mold support means being mounted for pivotal movement about said pivot axis independently of the other of said mold support means.

2. The apparatus of claim 1 which further includes guideway means having said second mold support means mounted thereon and being pivotally movable about said pivot axis, and wherein said drive means comprises a double-acting fluid powered cylinder connected between said guide means and said second mold support means.

3. The apparatus of claim 1 further includes first mold rotating drive means connected between said first mold support and said frame for rotating said first mold support means about said pivot axis, and second mold rotating drive means connected between said second mold support means and said frame and independent of said first drive means, for rotating said second mold support means about said pivot axis.

4. The apparatus of claim 3 wherein each of said first mold rotating drive means and said second mold rotating drive means comprise a double-acting fluid cylinder connected between said frame and said respective first or second mold support means.

5. The apparatus of claim 4 which further includes guideway means having said second mold support means mounted thereon and being pivotally movable about said pivot axis, and wherein said drive means comprises a double-acting fluid powered cylinder connected between said guideway means and said second mold support means.

6. Mold handling apparatus comprising a frame on which is mounted first mold support means to which a first mold portion is to be secured, and second mold support means to which a second mold portion is to be secured, drive means connected to at least one of said mold support means and operative during use of the apparatus to effect mold closing and mold opening relative movements between said two mold support means, guideway means mounted for pivotal movement relative to said frame about a pivot axis, one of said two mold support means being mounted for substantially linear movement along said guideway means independently of the other of said mold support means, said pivot axis extending transversely of the direction of said substantially linear movement, first mold rotating drive means connected between said first mold support means and said frame for rotating said first mold support means about said pivot axis, and second mold rotating drive means connected between said second mold support means and said frame and independent of said first drive means, for rotating said second mold support means about said pivot axis.

7. The apparatus of claim 6 wherein each of said first mold rotating drive means and said second mold rotating drive means comprise a double-acting fluid cylinder connected between said frame and said respective first or second mold support means.

8. Mold handling apparatus comprising a frame on which is mounted first mold support means to which a first mold portion is to be secured, and second mold support means to which a second mold portion is to be secured, guideway means having one of said two mold support means mounted thereon for substantially linear movement along said guideway means and said guideway means and the other of said two mold support means being mounted for independent pivotal movement relative to said frame about a pivot axis which extends transversely of the direction of said substantially linear movement, the apparatus further comprising drive means connected to said mold supports and operative during use of the apparatus to effect pivotal movement of the two mold support means about said pivot axis, and to effect said substantially linear movement of said one of two mold support means to effect mold closing and mold opening movements thereof.

9. The apparatus of claim 8 wherein said drive means comprises a plurality of double-acting fluid cylinders connected to said first and second mold supporting means.

10. The apparatus of claim 8 wherein said two mold support means are each movable about said pivot axis through an angle of at least 90°.

* * * * *

PO-1050
(5/69)

UNITED STATES PATENT OFFICE
CERTIFICATE OF CORRECTION

Patent No. 3,986,812      Dated October 19, 1976

Inventor(s) Joseph Barker & Terence J. L. Clarke

It is certified that error appears in the above-identified patent and that said Letters Patent are hereby corrected as shown below:

Column 9, Cl. 1, Line 5, after the word connected insert --to--

Column 9, Cl. 1, Line 13, after the word linear insert --relative--

Column 9, Cl. 3, Line 1, after the numeral 1 insert --which--

Signed and Sealed this

Eighteenth Day of January 1977

[SEAL]

*Attest:*

RUTH C. MASON
*Attesting Officer*

C. MARSHALL DANN
*Commissioner of Patents and Trademarks*